United States Patent [19]
Rinde et al.

[11] Patent Number: 5,883,457
[45] Date of Patent: Mar. 16, 1999

[54] ORGANIC MATRIX FOR ACOUSTIC REFLECTOR ARRAY

[75] Inventors: James A. Rinde; Barry C. Mathews, both of Fremont, Calif.

[73] Assignee: Raychem Corporation, Menlo Park, Calif.

[21] Appl. No.: 839,995

[22] Filed: Apr. 24, 1997

[51] Int. Cl.[6] .................................................. H01L 41/08
[52] U.S. Cl. ................................. 310/313 D; 310/313 R
[58] Field of Search ........................... 310/313 R, 313 O

[56] References Cited

U.S. PATENT DOCUMENTS

| | | | |
|---|---|---|---|
| Re. 33,151 | 1/1990 | Adler | 178/18 |
| 3,883,831 | 5/1975 | Williamson et al. | 333/30 R |
| 4,090,153 | 5/1978 | Toda et al. | 333/30 R |
| 4,188,596 | 2/1980 | Miura | 333/151 |
| 4,198,623 | 4/1980 | Hisek et al. | 340/365 P |
| 4,403,165 | 9/1983 | Ballato et al. | 310/313 D |
| 4,510,410 | 4/1985 | Yuhara et al. | 310/313 D |
| 4,598,224 | 7/1986 | Ballato | 310/313 R |
| 4,642,423 | 2/1987 | Adler | 178/18 |
| 4,644,100 | 2/1987 | Brenner et al. | 178/18 |
| 4,645,870 | 2/1987 | Adler | 178/19 |
| 4,700,176 | 10/1987 | Adler | 340/365 R |
| 4,746,914 | 5/1988 | Adler | 340/712 |
| 4,791,416 | 12/1988 | Adler | 340/172 |
| 4,825,212 | 4/1989 | Adler et al. | 340/706 |
| 4,859,996 | 8/1989 | Adler et al. | 340/712 |
| 4,880,665 | 11/1989 | Adler et al. | 427/126.3 |
| 4,895,017 | 1/1990 | Pyke et al. | 73/23 |
| 4,947,677 | 8/1990 | Frye et al. | 73/38 |
| 5,051,645 | 9/1991 | Brace et al. | 310/313 D |
| 5,072,427 | 12/1991 | Knowles | 367/118 |
| 5,076,094 | 12/1991 | Frye et al. | 73/19.03 |
| 5,113,115 | 5/1992 | Mariani | 310/313 D |
| 5,117,146 | 5/1992 | Martin et al. | 310/313 R |
| 5,130,257 | 7/1992 | Baer et al. | 436/151 |
| 5,138,215 | 8/1992 | Mariani | 310/313 D |
| 5,151,110 | 9/1992 | Bein et al. | 55/75 |
| 5,162,618 | 11/1992 | Knowles | 178/18 |
| 5,177,327 | 1/1993 | Knowles | 178/18 |
| 5,187,980 | 2/1993 | Blair et al. | 73/599 |
| 5,224,972 | 7/1993 | Frye et al. | 55/18 |
| 5,235,235 | 8/1993 | Martin et al. | 310/313 D |
| 5,243,148 | 9/1993 | Knowles | 178/18 |
| 5,260,521 | 11/1993 | Knowles | 178/18 |
| 5,260,913 | 11/1993 | Kadota et al. | 367/140 |
| 5,283,037 | 2/1994 | Baer et al. | 422/82.01 |
| 5,313,820 | 5/1994 | Aylsworth | 73/24.01 |
| 5,321,331 | 6/1994 | Baer et al. | 310/313 D |
| 5,323,636 | 6/1994 | McGowan et al. | 73/24.01 |
| 5,325,704 | 7/1994 | Mariani et alf. | 73/24.06 |
| 5,329,070 | 7/1994 | Knowles | 178/18 |
| 5,332,238 | 7/1994 | Borucki et al. | 277/228 |
| 5,334,805 | 8/1994 | Knowles et al. | 178/18 |
| 5,339,675 | 8/1994 | DiLeo et al. | 73/24.04 |
| 5,369,979 | 12/1994 | Aylsworth et al. | 73/24.01 |
| 5,380,959 | 1/1995 | Knowles | 178/18 |
| 5,387,462 | 2/1995 | Debe | 428/245 |
| 5,400,788 | 3/1995 | Dias et al. | 128/662.03 |
| 5,418,058 | 5/1995 | DeQuan et al. | 428/327 |
| 5,451,723 | 9/1995 | Huang et al. | 178/18 |
| 5,465,608 | 11/1995 | Lokshin et al. | 73/24.01 |
| 5,476,002 | 12/1995 | Bowers et al. | 73/24.01 |
| 5,478,756 | 12/1995 | Gizeli et al. | 436/527 |
| 5,488,866 | 2/1996 | Ravel et al. | 73/579 |
| 5,488,955 | 2/1996 | Dias | 128/662.03 |
| 5,511,296 | 4/1996 | Dias et al. | 29/25.35 |
| 5,571,944 | 11/1996 | Pfeifer et al. | 73/24.04 |
| 5,573,077 | 11/1996 | Knowles | 178/19 |
| 5,589,396 | 12/1996 | Frye et al. | 436/73 |
| 5,591,945 | 1/1997 | Kent | 178/19 |
| 5,648,643 | 7/1997 | Knowles et al. | 178/19 |

FOREIGN PATENT DOCUMENTS

WO 96/23292  8/1996  WIPO .............. C09G 5/00

OTHER PUBLICATIONS

Grewe et al., 1989 Ultrasonics Symposium, pp. 713–716 (1989).

Lees et al, IEEE Trans. Sonics Ultrasonics, vol. SU–24, No. 3, pp. 223–225 (May 1977).

Wortman et al., Statutory Invention Registration No. H00675, Sep. 1989.

*Primary Examiner*—Thomas M. Dougherty
*Attorney, Agent, or Firm*—Herbert G. Burkard; Yuan Chao

[57] ABSTRACT

A touch sensor system, including a substrate, capable of propagating surface acoustic waves; and a reflective array formed on said substrate, said reflective array having a plurality of reflective elements, each reflective element reflecting a portion of an incident surface acoustic wave. The reflective array is formed of an organic matrix. The organic matrix is preferably chemically bonded to the substrate, and is preferably a thermoset resin. The resulting reflective arrays are preferably stable under changes in moisture between 0% and 60% RH at temperatures between about 0°–50° C. The organic matrix can also be used in a humidity or chemical sensor.

22 Claims, 1 Drawing Sheet

ORGANIC MATRIX FOR ACOUSTIC REFLECTOR ARRAY

STATEMENT REGARDING FEDERALLY SPONSORED RESEARCH OR DEVELOPMENT

Not Applicable.

CROSS-REFERENCE TO RELATED APPLICATIONS

Not Applicable.

BACKGROUND OF THE INVENTION

This invention relates to acoustic structures for interaction with surface acoustic waves, and more particularly to such structures suitable for arrays of acoustic reflectors in acoustic touch sensors and to organic matrix materials for making such structures.

"Surface acoustic waves" (SAW), as used herein, refers to acoustic waves for which a touch on the surface leads to a measurable attenuation of acoustic energy. Several types of surface acoustic waves are known. The vast majority of present commercial products are based on Rayleigh waves, which maintain a useful power density at the touch surface because they are bound to the touch surface. Mathematically, Rayleigh waves exist only in semi-infinite media. In practice it is sufficient for the substrate to be 3 or 4 wavelengths in thickness, leading to quasi-Rayleigh waves that are practical equivalents of true Rayleigh waves. Herein, it is understood that Rayleigh waves exist only in theory and a reference thereto indicates a quasi-Rayleigh wave. Like Rayleigh waves, Love waves are surface-bound waves. While Rayleigh waves have vertical and longitudinal particle motion and both shear and pressure/tension stresses associated therewith, Love waves have only horizontal particle motion (parallel to touch surface) and only shear stress associated therewith. Other surface-bound waves are known.

Another class of surface acoustic waves relevant to acoustic touchscreens are plate waves. Unlike surface-bound waves, plate waves require the confining effects of both the top and bottom surfaces of a substrate to maintain a useful power density at the touch surface. Examples of plate waves include symmetric and anti-symmetric Lamb waves, zeroth order horizontally polarized shear (ZOHPS) waves, and higher order horizontally polarized shear (HOHPS) waves.

SAW devices are used as touch sensors, signal filters, and in other applications. A common touch sensor design has two sets of transducers, each set having a different axis aligned respectively with the axes of a physical Cartesian coordinate system defined by a substrate. An acoustic pulse or pulse train is generated by one transducer, propagating as a Rayleigh wave along an axis which intersects an array of reflective elements, each element angled at 45° and spaced corresponding to an integral number of acoustic wavelengths. Each reflective element reflects a portion of the wave along a path perpendicular to the axis, across an active region of the substrate, to an opposing array and transducer which is a mirror image of the first array and transducer. The transducer in the mirror image array receives an acoustic wave consisting of superposed portions of the wave reflected by the reflective elements of both arrays, directed antiparallel to the emitted pulse. Wavepaths in the active region of the sensor have characteristic time delays, and therefore any wavepath attenuated by an object touching the active region may be identified by determining a timing of an attenuation in the composite returning waveform. A second set of arrays and transducers are provided at right angles to the first, and operate similarly. Since the axis of a transducer corresponds to a physical coordinate axis of the substrate, the timing of an attenuation in the returning wave is indicative of a Cartesian coordinate of a position on the substrate, and the coordinates are determined sequentially to determine the two dimensional Cartesian coordinate position of the attenuating object. Other acoustic touch position sensor designs may be used. Illustrative designs are disclosed in U.S. Re Pat. No. 33,151; U.S. Pat. No. 4,642,423; U.S. Pat. No. 4,644,100; U.S. Pat. No. 4,645,8870; U.S. Pat. No. 4,700,176; U.S. Pat. No. 4,746,914; U.S. Pat. No. 4,791,416; U.S. Pat. No. 4,825,212; U.S. Pat. No. 4,880,665; U.S. Pat. No. 5,072,427; U.S. Pat. No. 5,162,618; U.S. Pat. No. 5,177,327; U.S. Pat. No. 5,234,148; U.S. Pat. No. 5,260,521; U.S. Pat. No. 5,260,521; U.S. Pat. No. 5,329,070; and U.S. Pat. No. 5,451,723; all incorporated herein by reference.

The maximum acoustic path length traveled by the acoustic pulse is a useful metric in acoustic touchscreen design, because most materials, e.g., glass, have a relatively constant acoustic power loss (dB per unit length): the greater the path length, the greater the attenuation. In many cases, this attenuation limits the design of the touchscreen. Therefore it is generally desirable to have high acoustic efficiency. Thus, for example, greater numbers of transducers may be deployed to allow larger substrates, and likewise, with smaller substrates, acoustic paths may be folded to reduce the number of transducers.

The array of reflective elements forms a critical part in the design of an acoustic touchscreen. Because the elements are placed along the path of the acoustic wave, it is generally desired that the ratio of reflection to absorptivity be maximized, allowing sufficient wave energy to reach the end of the array while reflecting sufficient wave energy to allow reliable detection of the touch.

Generally, SAW propagation efficiency is maximized by the wave's interaction with a brittle material such as glass and avoiding materials which appear viscous to it. In fact, it is the inefficient propagation of the surface acoustic wave due to interactions with environmental effects which enables SAW-based chemical or humidity sensing by measuring the signal loss due to the interactions.

Present commercial acoustic touchscreens typically are built from soda-lime glass and placed immediately in front of a display device such as a cathode ray tube (CRT), with the reflective arrays disposed at the periphery of the substrate, outside of the active sensing area and hidden and protected under a bezel. The reflective elements each generally reflect of order 1% of the SAW power, dissipating a small amount and allowing the remainder to pass along the axis of the array. Thus, array elements closer to the transmitting transducer will be subjected to greater incident acoustic energy and reflect a greater amount of acoustic power. In order to provide equalized acoustic power at the receiving transducer, the spacing of the reflective elements may be decreased with increasing distance from the transmitting transducer, or the acoustic reflectivity of the reflective elements may be altered, allowing increased reflectivity with increasing distance from the transmitting transducer.

An acoustic beam incident on a reflector produces a transmitted (unreflected) portion, a reflected portion, and an absorbed portion. An optimal reflector material is one with minimal acoustic absorption. More precisely it is desirable to maximize the ratio of reflected power to absorbed power. The mass of material deposited can be adjusted to achieve a desired ratio of reflected to transmitted power.

Present reflective arrays are generally a chevron pattern of raised glass frit interruptions on a soda-lime glass substrate. The interruptions typically have heights or depths on the order of 1% of the acoustic wavelength, and therefore only partially reflect the acoustic energy. Glass frits such as those in touchscreens from Elo TouchSystems, Inc., Fremont, Calif., are near optimal in this regard. When cured (fused), they have a high mechanical quality factor or Q, which is a measure of quality and freedom from internal damping, or more technically, the quotient of the resonant frequency and the bandwidth. This leads to minimal acoustic absorption by the reflectors.

Glass frit is generally supplied as a printable gel-like ink comprising a mixture of solvents, organic binders imparting thixotropic properties, and fine particles of "solder glass" (a mixture of zinc and lead oxides). The glass frit is screen-printed onto the substrate and transformed into a hard glassy substance by a high temperature (over 400° C.) cure in an oven to evaporate the solvents, burn off the binders, and sinter together the remaining fine particles of solder glass. The substrate carrying the printed reflector pattern is necessarily subjected to the same high temperature during sintering. Thus, the choice of substrates is restricted: Tempered glass looses its temper at such curing temperatures and CRT faceplate glass cannot be used because of the heat sensitivity of the CRT's other components. Another limitation is the presence of heavy metals whose potential for leaching out by, e.g., the acetic acid found in some glass cleaners is a health hazard.

The glass frit cure process is a significant cost component. Ovens are a major capital expense and consume significant amounts of electric power. Conveyor ovens require considerable floor space, while batch ovens disrupt a smooth manufacturing flow. The cure process takes time, about one hour for a conveyor oven and about eight hours for a batch oven. Thus, it is desirable to supplement or replace the glass-frit process.

Polymers tend to be more acoustically absorptive than glass, and even a small amount thereof deposited as reflectors on a touchscreen can cause significant acoustic attenuation. Therefore, in comparison with glass frit systems, the ratio of the transmitted signal to the minimally acceptable received signal amplitude will be less for polymers, typically exceeding 6 dB in a 14 inch touchscreen.

In addition to their significant acoustic attenuation properties, many polymers are hydrophilic. An epoxy may absorb up to 10% moisture. This absorption may result in delamination of an epoxy film from a substrate such as glass. Thus, many epoxies have poor bonding ability to glass under a range of environmental conditions.

Epoxies have been used as absorbers of acoustic waves. U.S. Pat. No. 4,090,153 teaches filled epoxy resin as an absorber of Rayleigh waves propagating on the surface of a piezoelectric substrate. U.S. Pat. No. 4,510,410 relates to filled ultraviolet (UV) light curable resin acoustic wave absorbers for piezoelectric substrates. The patent presents data (FIG. 3) showing that the actual absorption rises with increasing specific gravity (filler loading) and considers reflections off the absorbers to be parasitic. U.S. Pat. No. 5,400,788 relates to a tungsten filled epoxy employed as an absorber of pressure waves. U.S. Pat. No. 5,488,955 relates to a tungsten filled epoxy employed as a beam dump (a structure for diverting and eliminating beam energy from a normal acoustic beam path). While a portion of the acoustic waves may be reflected, in this case the goal is to attenuate as much of the wave as possible. The preceding four patents are incorporated herein by reference.

U.S. Pat. Nos. 5,113,115 and 5,138,215, incorporated herein by reference, relate to unfilled polymer acoustic reflectors, making similar use of polymer Rayleigh-wave reflectors on a piezoelectric substrate, for diverting beam energy from the active acoustic path. U.S. Pat. No. 5,138,215 describes a transmit reflective array, a receive reflective array, as well as the polymer array which serves as a "beam dump" array. The beam-dump array is referred to as the "third" or "auxiliary" array. The patent does not teach that the transmit or receive arrays may be formed of polymer. In a beam dump system, the goal is to make the absorption of acoustic waves efficient, while preventing the introduction of parasitic waves. In sharp contrast to the transmit and receive arrays, the ability of the beam-dump array to transmit an acoustic beam down its axis is not of particular concern.

U.S. Pat. No. 5,260,913 discloses encasing SAW devices to shield them from environmental influences. Low modulus potting materials absorb Rayleigh waves, so wave modes other than Rayleigh, such as horizontal shear waves, are employed. "Acoustic Properties of Particle/Polymer Composites for Transducer Backing Applications" by Grewe et al. from 1989 Ultrasonics Symposium, and "Ultrasonic Measurement of Some Mineral Filled Plastics" by Lees et al., IEEE Transactions on Sonics and Ultrasonics, Vol. SU-24, No. 3, May 1977, disclose using tungsten loaded epoxies for acoustic purposes. However, these references do not suggest the use of such materials for reflective arrays or printable inks.

As is evident from the above discussion, polymeric acoustic reflectors are desirable for acoustic touchscreens in which the substrate is tempered glass, the faceplate of a CRT, or another substrate which cannot tolerate the high cure temperatures of glass frits. However, the use of polymers poses serious problems for the design engineer, being limited by the polymer's (a) adhesion to a suitable substrate; (b) acoustic absorptivity; (c) mechanical stability toward a range of environmental conditions; and (d) acoustic property stability over a range of environmental conditions; and (e) availability of a process for fabrication into quality reflective elements. These factors have proven sufficiently complex that extant systems have continued to employ glass frits on soda lime glass substrates.

BRIEF SUMMARY OF THE INVENTION

This invention provides a system for sensing perturbation of an acoustic wave propagating in a substrate having an organic matrix (or polymer resin) forming elements of an array for reflecting portions of the acoustic wave along an acoustic sensing path. In one embodiment, the polymer is preferably a curable resin. The curable resin preferably is a thermally curable (thermosetting) resing or a UV light curable resin and especially preferably is a thermosetting epoxy resin. The resin preferably cures at a temperature above 50° C. but below 250° C. In another embodiment, the polymer is preferably chemically bonded to the substrate. In a further embodiment, the polymer has acoustic properties which are stable under relative humidity (RH) of between about 10% to about 60%, at temperatures between about 10° C. and 35° C. Preferably, the stability of the polymer extends beyond this range, for example 0–60% RH at between about 0° C. and 50° C., and more preferably 0–100% RH at between about −20° C. and 60° C., or for short periods of time in the presence of solvents, acids and bases.

Besides their acoustic absorptivity, polymers also have another property of potential significance. Many polymers are affected by environmental gasses, moisture and other chemicals. When a chemical is absorbed or adsorbed by a polymer, the latter's physical properties may change, altering its interaction with an acoustic wave. Thus, acoustic absorption/reflection ratio may change with environmental conditions, such as RH and temperature. Two potential effects account for these changes. First, the absorption of, e.g., moisture reduces the polymer's density and changes its physical configuration. Second, the water in the polymer matrix may increase the viscous nature of the polymer and reduce its glass transition temperature ($T_g$), resulting in viscous damping of the acoustic wave, or at least variations in acoustic absorptivity.

The $T_g$ is the temperature at which a significant component of the polymer undergoes a change between a rigid, glassy state to a softer rubbery state and is related to both the component's identity as well as the degree of crosslinking. $T_g$ is believed to be a significant factor in the acoustic interactions of a polymer, as well as its environmental stability. The exact value of a measured $T_g$ depends on the measurement method. As employed herein, $T_g$ may be defined by measurements per ASTM E1640-94 with sample pre-conditioning per ASTM D618-95. The $T_g$ of the polymer preferably is above about 60° C., more preferably above about 120° C., and most preferably above about 170° C.

For a SAW touchscreen to function, the reflective elements must have the correct balance of reflectivity, absorptivity and transmissivity. If the acoustic absorption to reflection ratio is too high, a suitable reflective array cannot be constructed, because insufficient signal will reach the end of the touchscreen. Glass frit ink has an absorption of about 0.2 dB/inch. The SAW absorption at 5.53 MHz of epoxy based inks have been measured at from 0.8 to 5 dB/inch. To improve the reflectivity of the polymer based inks, they are filled with an inorganic filler to increase their density. The filler preferably is a powdered dense filler having a density greater than 2.0 g/cm$^3$, more preferably greater than 4.0 g/cm$^3$. The reflective elements of the present invention are acoustically thin and intended to be efficient reflectors. The reflectivity of a reflective element is dependent on its mass. All other things being equal, an appropriately designed and situated element will have a higher reflectivity to absorptivity ratio if it has greater mass. Other surface structures, intended for acoustic absorption, are acoustically thick, and greater mass is correlated with increased absorption.

In contrast to current high-temperature curing glass frit compositions, the present invention's polymeric inks cure at below 200° C. At 200° C. tempered glass looses only 1% of its strength in 10,000 hours.

Preferably, the polymer is tightly cross linked and has a low moisture absorption, for example 3–5% maximum by weight, rather than the typical 10% for hydrophilic polymers having a lower degree of cross linking. Low crosslinking density also correlates with reduced resistance to swelling of a polymer matrix upon exposure to chemicals. With high moisture absorption, swelling of the polymer causes a change in $T_g$, a change in acoustic properties (e.g., increase in attenuation), and a possible loss of adhesion to the substrate or delamination due to both expansion coefficient mismatch-induced mechanical strains and chemical effects on the polymer matrix. It has been found that, in a prototype touchscreen system, the acoustic properties of a touchscreen with a glass substrate and low $T_g$ polymer reflective arrays were unstable, becoming non-functional under hot and wet conditions. This deficiency was absent in an otherwise similar high $T_g$ polymer reflective array system.

The present polymeric reflectors also allow reliable adhesion to lower temperature expansion coefficient glasses than soda lime glass, such as borosilicate glass. In contrast, solder glass frits on a borosilicate glass substrate may be scraped off with a razor blade more easily than the same frit on soda lime glass.

While polymer reflective elements have an acoustic absorption which is generally greater than glass frits, the use of polymer reflectors allow the placement of a reflective array directly on the faceplate of a CRT monitor, whose lower acoustic absorption compensates for the increased reflector losses. Further, low temperature processing techniques allow use of tempered glass, or other temperature sensitive substrates.

A preferred embodiment according to the present invention provides a "direct-on-tube" touchscreen system, in which the faceplate of a CRT serves as the substrate of an acoustic touchscreen. Such a system provides a number of advantages. The total cost of the integrated system is reduced over the separate parts. This eliminates the largest material cost in typical acoustic touchscreen products: the curved soda-lime glass substrate. The cost of mechanically reworking a CRT monitor to make room for a touchscreen is reduced. Furthermore, the resulting product is of higher quality. By eliminating reflections from surfaces of the soda-lime glass, perceived quality of the CRT image is significantly enhanced. Presently no manufacturing technique exists for a "direct-on-tube" (for a fully assembled CRT) embodiment using glass frit reflectors.

Epoxy materials, especially those with a high degree of cross linking, typically lead to signal losses of less than 3 dB. Measurements have shown that filled UV light cure inks may have, for example, acoustic losses as high as 10 dB, which may be acceptable in some cases. Propagation of acoustic signals on CRT faceplate glass, instead of soda lime glass, can add more that 10 dB of signal, e.g., 10–30 dB, thus enabling use of UV curable inks. Loading of a polymer ink with inorganic materials can increase acoustic reflectivity without increasing acoustic absorption.

Most polymers are loosely bound collections of linear polymer chains. The low activation energy for slippage between linear chains provides a viscous damping mechanism for acoustic absorption. In contrast, cured epoxies have a dense three-dimensional network of covalent bonds, with a $T_g$ above 100° C., or 130° C. or higher. This suppresses the viscous motion and viscous damping of acoustic energy. For these reasons, epoxies tend to be brittle. The inventors have deduced that the dense three-dimensional network of molecular bonds also implies reduced acoustic absorption if used as an acoustic reflector material, and these materials are therefore preferred. Three general types of cure methods are available for epoxies: (a) two part thermosetting mixes, which cure in minutes to hours after mixing, (b) UV light curable epoxies, which are stable in the dark, yet cure in the presence of UV light, and (c) one part thermoset epoxies, which have extended shelf life at room temperature, but cure at elevated temperatures, for example 140°–250° C.

An UV cure process is attractive because of the relatively short cure times, low capital equipment cost, long shelf life, and relative insensitivity to substrate choice. Due in part to the circuit-board industry, UV light curable inks are available that are printable and robust after cure. Most UV light curable inks, e.g., acrylic-based polymers, can be formulated to polymerize into linear chains when cured. Visco-elastic damping mechanisms are expected to play a larger role for such polymers, resulting in increased acoustic losses. Therefore, UV cured polymers are best used with low acoustic loss substrates, such as CRT faceplate glass. Other compositions, using acrylic curing agents, may also be UV light curable, resulting in a highly cross-linked structure. Adjustments in the amount of UV light needed may be necessary because of the light-blocking effect of the dense filler.

Loading of the polymer ink with a dense material, such as an inorganic composition, provides two potential advantages. It reduces the height of deposited reflector material needed to achieve a given desired reflectivity. More importantly, it increases the ratio of reflection to absorption.

Reflectivity is largely determined by the mass loading on the substrate surface, namely the reflector height times the specific gravity of the cured reflector material. Polymers typically have a specific gravity in the 0.9 to 1.5 $gm/cm^3$ range. Cured glass frit has a density of about 5.6 $gm/cm^3$. For the same reflectivity, the height for a polymer reflector must be four to five times that for a glass frit reflector.

By loading the polymer ink with denser material, the density of the reflector material is increased and hence the desired reflector height is decreased. To assure quality manufacturing, it is required that the heterogeneous combination of the polymer matrix and dense filler be uniform, generally in both the uncured and cured states. This uniformity requirement poses problems, for example, with multi-part polymer resin adhesives, which are mixed shortly prior to use, due to the very small volumes of each reflective element, which are microns high and wide, and between 0.5–2.0 cm long.

Depending on the details of the printing process, it may be advantageous from a manufacturing perspective to reduce the reflector height. For a given reflector height, loading of the polymer ink is observed to increase reflectivity without increasing absorption. After tuning the array design (fewer reflectors) and/or reducing the reflector height, this reduces the signal loss due to reflector material for an acoustic touchscreen.

According to a preferred embodiment of the invention, the polymer of the reflector forms a chemical bond with the substrate. This chemical bond is achieved by one of three methods: First, the substrate may be pretreated with an agent which chemically bonds to the surface and provides functional elements for reaction with the polymer. Second, the polymer may include a component which forms stable links to the substrate and which becomes an integral part of the polymer. Third, the polymer itself may bond to the substrate surface to form a smooth transition after curing. An example of the first method is the pretreatment of a silicate glass substrate with a bifunctional silane agent. An example of the second method is the addition of a bifunctional silane agent, e.g., an epoxy silane, to the bulk of the polymer matrix, for adhesion to a silicate glass substrate. The third method is the use of a compatible material for the reflective array and the substrate, such as a polymer reflective array on a polymer substrate.

In the latter case, the adhesion of a printed array to the substrate may be improved if the substrate includes a functionalized surface, for example if the components are not in strict stoichiometric relation. It is noted that the array material may be the same or different from the substrate, and in fact each may employ totally different chemistries.

It is also possible to use one or more methods of chemically bonding the polymer array to the substrate, for example, pretreating the substrate and employing a polymer formulation including a functional bonding agent. Plasma, corona, and flame treatments are also known methods for pretreating polymer surfaces in order to create functional groups for chemical bonding.

The polymer may be applied in the desired touchscreen pattern in various manners. For polymeric inks having similar physical characteristics to glass frit inks, the preferred method is screen printing (silk screening). Pad printing may be employed where ink viscosity and thixotropicity precludes silk screening. Pad printing is also desirable for printing on high radius of curvature surfaces, such as the edges of a CRT faceplate.

It is a still further object according to the present invention to provide a touch sensor system comprising a substrate capable of propagating acoustic waves, a transducer for receiving an acoustic wave from the substrate, and a reflective array formed on the substrate, the reflective array having a plurality of reflective elements, each reflective element reflecting a portion of an incident acoustic wave toward the transducer, the reflective array comprising an organic matrix, such that a substantially invariant signal is generated by the transducer under changes in RH and temperature, over a normal range of conditions encountered in a controlled climate, for example 10%–60% RH over a temperature range of 0°–35° C. More preferably, the range of operability extends between 0° and 50° C., over a humidity range between 0%–100% RH. Preferably, the organic matrix, after formation, is chemically bonded to or chemically continuous with the substrate, without a weak or fragile interface.

It is still another object of the invention to provide a sensor system, comprising a substrate capable of propagating acoustic waves; and a reflective array formed thereon, the reflective array having a plurality of elements, each element interacting with a portion of an incident acoustic wave, the reflective array comprising an organic matrix, the organic matrix, after formation, selectively absorbing a chemical species and altering the interaction with the incident acoustic wave, such that a concentration of the chemical species may be determined based on the alteration of the interaction. The chemical species may be a gas. If the acoustic wave propagating is of a type relatively insensitive to the presence of a liquid on the substrate's surface, for example a horizontally polarized shear wave (zeroth or higher order), then the chemical species may be present as (or dissolved in) a liquid.

A further object of the invention is to provide a sensor system, comprising a substrate capable of propagating surface acoustic waves; a reflective array formed thereon, the reflective array having a plurality of elements, each element reflecting a portion of an incident acoustic wave; a transducer, receiving a reflected portion of the acoustic wave; and a polymer having selective absorptivity for a chemical species, deposited on the substrate, a change in absorption of the chemical species by the polymer resulting in a change in the acoustic properties of the polymer, such change being represented by a characteristic timing (or timing change) of an acoustic signal received by the transducer.

BRIEF DESCRIPTION OF THE DRAWING(S)

FIG. 1 shows an acoustic touchscreen system having polymeric reflective elements formed on a substrate.

DETAILED DESCRIPTION OF THE INVENTION

Figure 1:
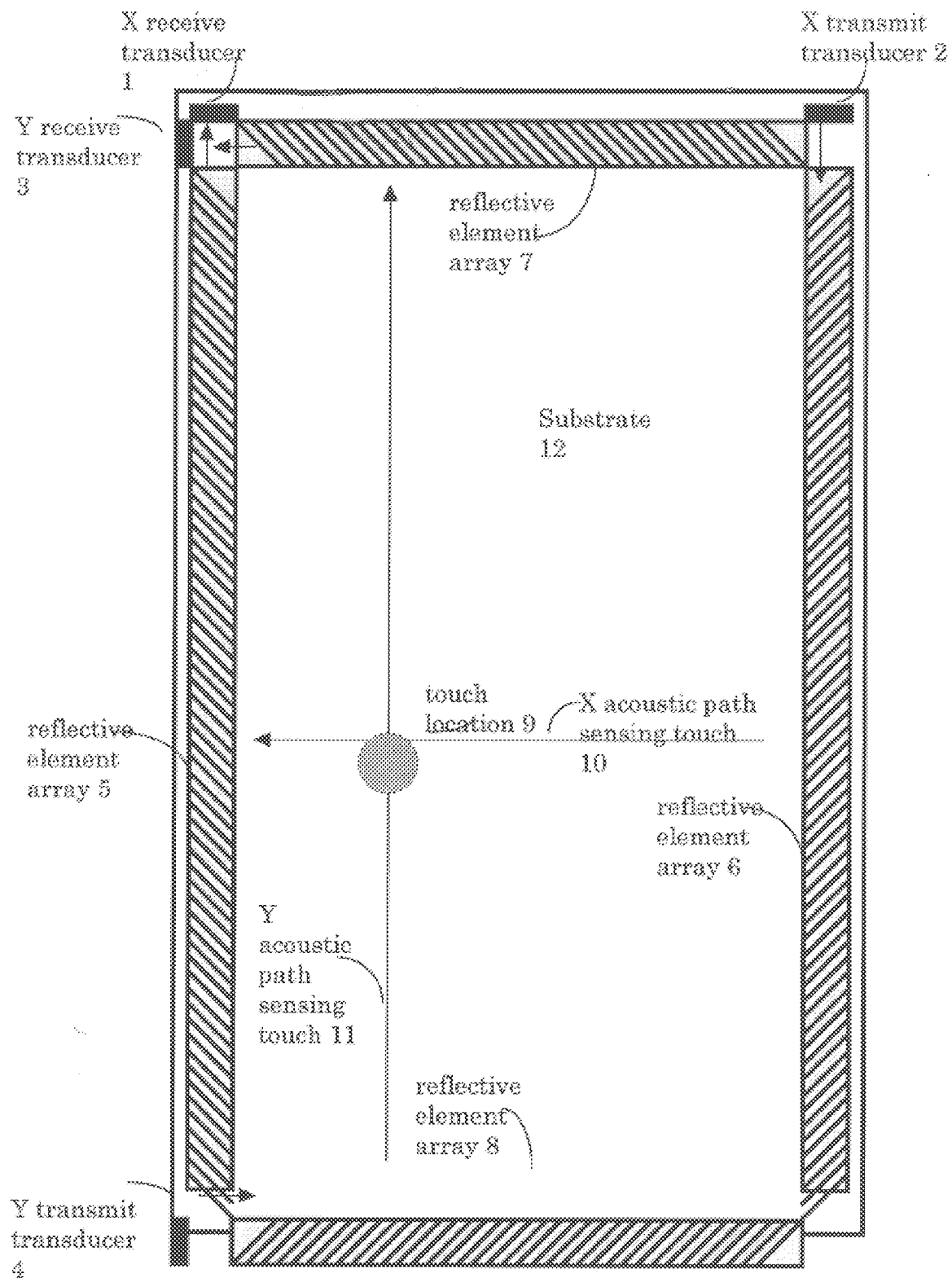

The below detailed description and examples are provided to illustrate aspects and examples of the present invention, and should not be considered to limit various other possible combinations or subcombinations of the elements.

Therefore, it should be understood that the below examples are preferred embodiments or portions of embodiments which form a part of the invention, which is to be construed in view of the entirety of the specification, including relevant aspects of the recited prior art and the claims.

FIG. 1 shows a typical touchscreen design wherein arrays of reflective elements 5, 6, 7, 8 are formed on a substrate 12. These reflective arrays are formed of an organic matrix with a dense filler. In the embodiment shown, separate transmitting 2, 4 and receiving 1, 3 transducers are provided for each axis.

FIG. 1 shows the reflective elements schematically, and in practice, the reflection intensity is modulated by varying the spacing of reflectors, or the height of reflectors, or both, to normalize the signal strength of each acoustic path from transmitting transducer to receiving transducer. If the initial reflectors reflect or absorb too much wave energy, the distal portions of the substrate will have insufficient acoustic energy, and will be insensitive to touch, while the proximal portion of the substrate will be sensitive to touch. By balancing the wave energies of the different wave paths, comparable signal to noise ratios for various portions of the substrate may be achieved, with touch sensitivity over the entire surface between the reflective arrays.

An acoustic wave, consisting of a finite duration pulse train is emitted by the X transmit transducer 2. Portions of the acoustic wave are reflected by each reflective element of the X axis transmit reflective element array 6, with one X acoustic path sensing touch 10 intersecting the touch location 9, resulting in an attenuation of the acoustic wave traveling over that path. The reflected portions of the acoustic wave reach the X axis receive reflective element array 5, and are redirected to the X axis receive transducer 1.

Likewise, an acoustic wave, consisting of a finite duration pulse train is emitted by the Y transmit transducer 4. Portions of the acoustic wave are reflected by each reflective element of the Y axis transmit reflective element array 8, with one Y acoustic path sensing touch 11 intersecting the touch location 9, resulting in an attenuation of the acoustic wave traveling over that path. The reflected portions of the acoustic wave reach the Y axis receive reflective element array 7, and are redirected to the Y axis receive transducer 3.

Materials

The organic matrix can comprise a curable resin selected from the group consisting of epoxy resin, cyanate ester resin, polyester resin, phenolic resin, bismaleimide resin and combinations thereof.

The term epoxy resin, as used herein, describes a curable composition including dimeric, oligomeric, or polymeric epoxy material. For example, those resins which result from the reaction of bisphenol A, or bisphenol F or other phenolic compounds with epichlorohydrin. Examples include: PY-307-1 bisphenol F epoxy resin, from Ciba Specialty Chemicals, a lower viscosity higher functionality epoxy resin, with a functionality of 2.3 and the viscosity is 30–50,000 cps; PY-306 bisphenol F epoxy resin monomer, from Ciba Specialty Chemicals Corp., having a viscosity of 1200–1800 cps, with a functionality of 2.0 (Bisphenol F resins are known for their low viscosities and resistance to crystallization.); Epon 825, a Bisphenol A epoxy resin monomer from Shell Chemical, with low viscosity, 4–6000 cps, and a functionality of 2.0; and Epon 862, a bisphenol F epoxy resin, from Shell Chemical, of low viscosity, 3000–4500 cps with a functionality of 2.0, and DER 732, a low viscosity (55–100 cps) flexible epoxy resin from Dow Chemical Co.

The epoxy resin may be a thermally curable epoxy resin or a UV curable epoxy resin. Conventional curing agents may be used, the main restriction being that the cure time should be long enough to allow printing of the touchscreen array. The preferred curing agents comprise latent catalysts that offer shelf lives of several months at room temperature. Examplary curing agents include: Amicure CG-1200, containing pure powdered dicyandiamide from Air Products, with a particle size of about 10 $\mu$m; urea type catalysts, such as 3-phenyl-1,1-dimethylurea and 3-(4-chlorophenyl)-1,1-dimethyl urea; imidazole catalysts, such as 2-phenyl imidazole, 2-phenyl-4-methyl imidazole, 2-heptadecylimidazole and 2-phenyl-4,5-dihydroxymethyl imidazole (Curazol 2-PHZ) which are modified imidazoles from Air Products. The imidazole catalysts are typically used alone, or as an accelerator with dicyandiamide to speed up the cure. Other suitable curing agents are Landec XE-7004, Ancamine 2337 XS, Ancamine 2014 or Ajicure PN-23, Ajicure MY 24, or Ajicure MY-H from Ajinomoto. Alternatively, UV light activated curing agents such as Cycure UVI-6974 (a mixture of triarylsulfonium hexafluoroantimonate salts) from Union Carbide may be used.

A cyanate ester resin is Bisphenol A dicyanate, available from Ciba Specialty Chemicals Corp. in several grades, including Arocy B-30, a medium viscosity resin. Cyanate ester resins will crosslink without the aid of a catalyst, but the reaction is faster and occurs at a lower temperature with the aid of a catalyst. Suitable catalysts include soluble metal carboxylates (naphthenate and octoates) or metal acetylacetonates with active hydrogen compounds (alkyl-phenols or higher boiling alcohol), such as zinc naphthenate, cobalt naphthenate or cobalt acetylacetonate with nonyl phenol. The cyanate ester resin can also be co-cured with epoxy resins. Ciba Specialty Chemicals Corp. also offers the M series of cyanate ester resins having lower moisture uptakes. (tetra o-methyl bisphenol F dicyanate) and a third series of resins based on hexafluorobisphenol A dicyanate (F series resins) having both low water absorption and flame retardancy. These resins may be cured to a $T_g$ as high as 230°–290° C.

Bismaleimide resins are available from Ciba Specialty Chemicals Corp., Shell Chemical and other sources. For example, the Matrimid 5292 resin system is available from Ciba, consisting of a Component A (4,4'-bismaleimidodiphenylmethane) and a component B (o,o'-diallyl Bisphenol A). These are mixed in the ratio of 100/85 and cured at 177°, 200° and 250° C. The resulting $T_g$ is dependent on cure time and temperature. $T_g$'s in the range of 200°–310° C. are possible. In formulating this polymer system to make reflective elements, filler and silane are added to the ink formulation.

Benzoxazine resins are curable resins that yield phenolic resins when crosslinked.

The substrate preferably comprises a siliceous composition, such as a glass, e.g., soda lime glass, borosilicate glass, or CRT faceplate glass, or quartz. The glass may be tempered, laminated, e.g., safety glass, and/or relatively thick, e.g., greater than about 1 cm thick. In order to provide a chemical bond between the siliceous substrate and the organic matrix, the substrate may be treated with a silane composition prior to formation of the reflective element array, and/or the organic matrix may include a silane composition. These silane compositions preferably have a plurality of functional groups. In these cases, the silane moiety interacts with the siliceous composition to form a bond, and another functionality becomes integrated into the organic matrix, chemically bonding the reflective element to the substrate. Alternatively the organic matrix may react at the surface of the substrate to form chemical bonds or a continuous phase without a weak interfacial layer.

Suitable powdered dense fillers for the organic matrix/polymer resin include tungsten metal, heavy metal salts such as barium sulfate and zinc sulfide, silver metal, silica (silicon oxide), calcium carbonate, tungsten trioxide, tungsten carbide, lead oxide, zinc oxide, other metals and metal oxides, and the like. The fillers may be used alone or in combination. Glass frit (lead and zinc oxides) may be employed, but environmentally more benign fillers are preferred. The fillers may advantageously increase the tensile strength of polymers and the thixotropicity of the uncured inks. Therefore, it is preferred that the filler serve these mechanical functions as well as increasing the density of the polymer.

Preferred fillers have densities of above about 4 gm/cm$^3$ but lower density fillers having densities above that of the polymer resin are also useful. Specific suitable fillers provided following. Tungsten powder is made by Osram Sylvania (Grade M-55, 5.2±0.5 μm size or Grade M-20, 1.25±0.15 μm size) and available from Atlantic Equipment Eng. A preferred dense filler is a co-precipitate of barium sulfate and zinc sulfide, available as Lithopone™ 70/30 from Sachtleben Chemie (70% barium sulfate and 30% zinc sulfide), having an average particle size of less 1 μm and a density of about 4.2 gm/cm$^3$.

Another useful additive is a surfactant, such as FC-430 from 3M. FC-430 is a fluorocarbon surfactant added to make the epoxy wet the glass surface, even if it becomes contaminated with hydrocarbons. Cab-O-Sil TS-720, a fumed silica, may be added to increase thixotropicity.

Coupling agents chemically bonding the polymer and the siliceous substrate can be a silane coupling agent such as N-(2-aminoethyl)-3-aminopropyltrimethoxy silane, 3-glycidoxy-propyltrimethoxy silane, and 3-methacryloxypropyl trimethoxy silane.

EXAMPLE I

The printing processes for glass frit inks and polymeric inks for reflective arrays were compared using nearly identical application procedures, with the viscosities of the materials closely matched. Using a Rheometrics viscometer, the viscosity of two lots of the glass frit ink was measured to be in the 15 to 2000 poise viscosity range, at test frequencies between 100–0.08 radians/sec, respectively. To match this viscosity, relatively low viscosity epoxy resins were selected.

The inventors believe that a high crosslink density is desirable to minimize the acoustic absorption of the polymer and sensitivity to environmental effects. To achieve this, they selected an epoxy system (PY-306 and Epon 825), with dicyandiamide curing agent and an imidazole accelerator (Curazol 2-PHZ). The resulting polymer ink formulation begins to cure, as indicated by a sharp increase in viscosity, at about 165° C. (with a temperature rise rate from ambient of about 7.5° C. per min). The dicyandiamide/Curazol 2-PHZ accelerator combination was also chosen because of its latency, providing extended room temperature shelf life, expected to be one year if undiluted and 3–9 months if diluted with solvent. Even in an accelerated aging test at 40° C., little change in the viscosity of the uncured formulation was observed after one month.

Since the glass frit density is 5.6 gm/cm$^3$, and polymer resins have a base density of about 0.9–1.5 gm/cm$^3$, it was desired to increase the effective density of the polymer resins by adding a dense filler. Six different formulations where made, with varying filler and filler loading levels, as shown in Table 1.

TABLE 1

| Material or Property | Example Number | | | | | |
|---|---|---|---|---|---|---|
| | 1a | 1b | 1c | 1d | 1e | 1f |
| PY-306 (g) | 50 | 50 | 50 | 50 | 50 | 50 |
| Epon 825 (g) | 50 | 50 | 50 | 50 | 50 | 50 |
| Amicure CG-1200 (g) | 8 | 8 | 8 | 8 | 8 | 8 |
| Curezol 2-PHZ (g) | 2 | 2 | 2 | 2 | 2 | 2 |
| Lithopone 70/30 (g) | 0 | 60 | 120 | 180 | 0 | 0 |
| Tungsten Powder (g) | 0 | 0 | 0 | 0 | 275.7 | 551.4 |
| Cab-O-Sil TS-720 (g) | 0 | 0 | 0 | 0 | 2 | 2 |
| Total (g) | 110 | 170 | 230 | 290 | 387.7 | 663.4 |
| Density (gm/cm$^3$) | 1.187 | 1.606 | 1.914 | 2.157 | 3.625 | 5.472 |

A test screen having dense reflective array patterns was screen-printed on soda lime glass substrates. The "test screen" prints include several large area test patterns. These large areas of dense patterns may produce adherence problems between the print screen and substrate, which are not necessarily seen in normal reflective array prints, for example due to surface tack of the polymer. This problem became more apparent for subsequent prints. It was found that adherence could be reduced by controlling the viscosity of the ink by addition of a solvent or diluent, wiping the bottom of the screen between prints with, e.g., isopropanol, and taping the glass plate down. Suitable diluents include 2-methoxyethyl ether (2-MEE), ethyl lactate, and silane additive, with the dilution ratio varied to account for the effect of filler type on viscosity and thixotropicity. A suitable cleaner for glass substrates is Sun-Up cleaner (Bell Industries, Los Angeles, Calif.), containing water, isopropanol, ammonia, sodium lauryl ether sulfate, and 2-butoxyethanol.

These epoxy formulations were cured in a belt drying oven, adjusted to give a peak temperature of 185° C. and a total residence time of 30 minutes, with a total period of about 18 minutes above 125° C. The substrates had a temperature which ranged from about RT to 185° C. during curing.

With the possible exception of Example 1a, the formulations listed in Table 1 provided the necessary printing resolution for fabricating reflective arrays such as shown in FIG. 1. Example 1a, undiluted, produced test prints of marginal resolution.

Due to the large surface area patterns in the test prints, which are not characteristic of the reflector arrays shown in FIG. 1, Example 1b, undiluted, experienced sticking of the substrate to the bottom of the screen, reducible with the addition of a solvent to the formulation, as in, e.g., Example 1c.

Example 1e was diluted with 5% 2-MEE, producing a high quality print. When it was diluted with 8% 2-MEE, the viscosity was too low to print well.

Example 1d had an increased filler concentration compared to Example 1c, making it thicker. Example 1d was diluted with 5% 2-MEE and produced high quality print samples. When diluted with 8% 2-MEE, its viscosity was too low to print well.

Example 1e was diluted with 1% 2-MEE, and had fair print quality, with some adherence between the substrate and print screen when printing the test pattern. When it was diluted with 2% 2-MEE, the resulting mixture was too thin to print well.

Example 1f was diluted with 2% 2-MEE, resulting in a desirable viscosity. In making a test print, the glass separated from the printing screen easily.

Table 2 shows attenuation and reflectivity data for epoxy-based inks of Examples 1a–1f, compared to cured glass frit, on soda lime glass.

TABLE 2

Attenuation and Reflectivity Data for Epoxy Inks of Examples 1a–1f

| Example Number | Attenuation (dB/inch) | Standard Deviation | Reflectivity Slope (dB/msec) |
|---|---|---|---|
| Glass Frit | 0.15 | 0.08 | 0.211 |
| Example 1a | 0.87 | 0.03 | * |
| Example 1b | 0.87 | 0.07 | 0.17 |
| Example 1c | 0.87 | 0.07 | 0.10 |
| Example 1d | 0.87 | 0.19 | 0.16 |
| Example 1e | * | * | 0.66 |
| Example 1f | * | * | 0.75 |

*Not Obtained

Reflective arrays fabricated with the unloaded (unfilled) formulation of Example 1a proved to be very inefficient reflectors, making reflectivity measurements difficult. This is related to poor print quality and to the low mass of unfilled polymer reflectors.

Reflective arrays of Examples 1b–1d, containing Lithopone™ filler, had similar reflective properties to reflective arrays fabricated from glass frit (last column of Table 2). While the attenuation values for Examples 1b–1d were significantly larger than for glass frit, they were still sufficiently small to support touchscreen designs in which less than 6 dB of signal is lost due to the use of these polymer reflector materials.

Examples 1e and 1f are tungsten filled formulations. They had the highest mass density (Table 1) and also the highest reflectivity (Table 2). The measured reflectivities of Examples 1e and 1f are much higher than even the glass frit. This is largely due to the fact that cured height for glass frit is about one-third of the print height, while the cured height is approximately equal to the printed height for the thermoset epoxy formulations.

Due to an artifact in the measurements of attenuation, absorption was not directly measured experimentally for the tungsten loaded Examples 1e–1f. Because of the similarity in the polymer matrix for all formulations in Table 1, all formulations are expected to have similar absorption, and hence Examples 1e and 1f are expected to have the best ratio of reflectivity to absorption.

EXAMPLE II

Based on the results of Example 1, the formulation of Example 1c was used as a model, but modified by the addition of a silane coupling agent to increase its adhesion to glass and of surfactant FC-430 to improve its wetting properties. The epoxy resin was also changed to increase the crosslink density. Since the resulting reformulated epoxy resin, Example 2b, is much higher in viscosity, ethyl lactate solvent (selected over 2-MEE for health hazard reasons) was added to reduce the viscosity. The added silane also acts as a diluent. Table 3 shows the compositions of Examples 2a–2d.

TABLE 3

| Material or Property | Example 2a | Example 2b | Example 2c | Example 2d |
|---|---|---|---|---|
| PY-307 (g) | 25 | 100 | 25 | 0 |
| Epon 862(g) | 75 | 0 | 75 | 0 |
| Ciba ECN 1138 (g) | 0 | 0 | 0 | 100 |
| Amicure CG-1200 (g) | 8 | 8 | 8 | 8 |
| Curezol 2-PHZ (g) | 2 | 2 | 2 | 2 |
| Ethyl Lactate (g) | 0 | 5 | 0 | 13 |
| FC-430 (g) | 0.2 | 0.2 | 0.2 | 0.2 |
| Epoxy silane (g) | 3 | 6 | 6 | 3 |
| Lithopone 70/30 (g) | 120 | 120 | 81 | 120 |
| Tungsten Powder (g) | 0 | 0 | 167 | 0 |
| Cab-O-Sil TS-720 (g) | 0 | 0 | 2 | 0 |
| Total (g) | 233.2 | 241.2 | 366.2 | 246.2 |
| Density (gm/cm$^3$) | 1.89 | 1.87 | 2.93 | 1.89 |

Example 2a was diluted with 3% ethyl lactate and produced a good quality test pattern print, but with some sticking. It was then diluted with 4% ethyl lactate, producing a good quality print, with reduced sticking. The Example 2b with 4% added ethyl lactate (making the total 6.1% by weight) printed appropriately.

Example 2c, having a mixture of tungsten and Lithopone™ fillers, was mixed with 2% epoxy silane (total 3.64% by weight). This formulation did not stick to the printing screen, and gave good test prints.

Example 2d was very viscous and tacky, because it contained a higher molecular weight epoxy. When it was diluted with a mixture of 3% epoxy silane and 6% ethyl lactate (making 4.22% epoxy silane and 11.28% ethyl lactate), a good test print resulted. Example 2d diluted with 9% ethyl lactate also resulted in a good test print.

The formulations of Example 2 illustrate the flexibility of formulations per this invention for tuning to optimize compatibility with a chosen manufacturing process. Acoustic data was collected to verify that this tuning did not unduly alter the reflection and absorption characteristics of the ink and resulted in acceptable acoustic performance.

EXAMPLE III

This example demonstrates printing of an actual reflector pattern for use in touchscreens. Example 2b was used with 4% added ethyl lactate for printing. The glass plates were soda lime glass, 10×12.5 inches ("large size") or 7.5×11 inches ("small size"), and were printed using a mask designed for the small size glass. In printing the touchscreen pattern, it was discovered that, in this case, it was not necessary to wipe the underside of the screen clean between prints or to tape down the glass plates. It is believed that this is due to the smaller area relative to the area of the test pattern. Also, the printing rate was as fast as the glass frit, greater than one print per minute.

Two touchscreens were assembled from the smaller screen, one on a small size glass and one on a piece of large size glass. Both had acceptable signals and produced fully functional Rayleigh wave touchscreens similar in function to Elo TouchSystems Model E284A-693 touchscreen, using an Elo Intellitouch controller, Model E281-2300.

EXAMPLE IV

A set of touchscreen prints were printed for testing of epoxy based ink formulations on the small size glass substrates for environmental testing and to try printing and curing on the 0.5 inch thick tempered glass.

To Example 2b, 4% epoxy silane was added (6.1% by weight). Three prints were printed on standard soda lime glass. To Example 2c, 2% epoxy silane was added (a total of 3.64% by weight). Three prints were printed on standard soda lime glass. All of the prints with both inks were of excellent quality.

Example 2b, with 4% epoxy silane added, was printed on four 0.5 inch thick tempered glass plates, and the first one was run through the conveyer belt oven. This first touch-sensor was monitored to determine whether the thick glass would get hot enough to cure the epoxy without causing it to crack due to thermal stresses during cooling. This information was the basis of a successful pilot production run of 40 pieces of glass in which no glass cracked due to thermal stresses.

The remaining three samples were cured in a room temperature oven and at 100° C. for 45 min, then 133° C. for 30 min, then 166° C. for 30 min, and finally 200° C. for 15 min. The oven was then turned off and allowed to cool.

Touchscreens made on standard soda lime glass and 0.5 inch thick tempered glass using Example 2b epoxy ink reflectors were found to form fully functional touchscreens.

EXAMPLE V

A small size touchscreen with the epoxy ink of Example 2b was tested for environmental stability by cycling between −25° C. to 65° C. in an environmental chamber for 35 days. The humidity varied from ambient to 60% RH. Peak condition was 60% RH at 65° C. The touchscreen remained functional during and after cycling. The x and y axis waveforms were measured at −20° C., room temperature (approximately 23° C.), 50° C. and 65° C. during the environmental cycling and showed only insignificant or small variations.

EXAMPLE VI

Ideally, the acoustic inks should have good resistance to various solvents and glass cleaners and should remain well bonded to the glass substrate. Glass frit reflectors have a deficiency in that they dissolve in vinegar.

The resistance of several epoxy ink formulations to various solvents was measured at room temperature, 40° C. and 60° C. A 1 mil thick layer of ink was coated on a soda lime glass slide and cured. The glass slide was soaked in the test fluid and adhesion to the glass slide measured from time to time. The test criteria is that the ink, after soaking, shows no evidence of delamination when scraped with a razor blade.

In addition to the previously detailed formulations, two new Examples 6a and 6b, listed in Table 4, were tested. Example 6a, with 3% added silane, is most relevant because it is almost the exact formulation for the Example 2b, which is a preferred formulation.

TABLE 4

| Material (g) | Example 6a | Example 6b |
|---|---|---|
| PY-307-1 | 75 | 25 |
| PY-306 | 25 | 0 |
| Epon 862 | 0 | 75 |
| Amicure CG-1200 | 8 | 8 |
| Curezol 2-PHZ | 2 | 2 |
| Epoxy silane | 0 | 3 |

The test results are provided in Table 5. The table shows that Example 6a ink with 3% added epoxy silane passed in 60° C. water/71 days and 60° C. 3% acetic acid/6 days. At 40° C. it also passed in 100% RH/71 days. At room temperature it passed after 71 days in MEK, toluene, iso-propyl alcohol, ethyl alcohol, 3% HCl, 3% $NH_4OH$, 3% $CH_3CO_2H$, and mineral oil. The ink passed for up to 71 days in 100% $CH_3CO_2H$ at room temperature without failing. The column "Silane on Glass" indicates whether the glass was treated with a silane reagent prior to depositing the epoxy. The column "Silane in Epoxy" indicates whether a silane reagent was added to the epoxy formulation. The column "Temp. (° C.)" indicates the test temperature, while "Solvent or Environment" indicates the solvent or environment to which the sample was subjected. The "Pass/Fail" column indicates if the sample endured the entire treatment period (P=pass, with duration of test indicated), or if peeling was evident prior to termination of the testing (F=fail, with time at which peeling was first evident). "AS" indicates the addition of amino silane, while "ES" indicates the addition of epoxy silane.

TABLE 5

Solvent/Environmental Resistance of Epoxy Ink Formulations
0.001 Inch Thick Cured Film on Glass Slides

| Example | Silane on Glass | Silane in Epoxy | Temp. (°C.) | Solvent or Environment | Pass/Fail |
|---|---|---|---|---|---|
| 1c | No | No | RT | 100% $CH_3CO_2H$ | F-3 days |
| 1c | No | No | RT | 3% $CH_3CO_2H$ (aq.) | P-81 days |
| 1c | No | No | RT | Deionized $H_2O$ | P-81 days |
| 1c | No | No | RT | 3% NaCl (aq.) | P-81 days |
| 1c | No | No | RT | Reagent Alcohol | P-81 days |
| 1c | No | No | RT | Toluene | P-81 days |
| 1c | No | No | RT | Mineral Oil | P-81 days |
| 1c | No | No | RT | 3% HCl (aq.) | F-14 days |
| 1c | No | No | RT | Acetone | P-81 days |
| 1c | No | No | RT | Isopropanol | P-81 days |
| 1c | No | No | RT | 3% $NH_4OH$ (aq.) | F-14 days |
| 1c | No | No | RT | 3% NaOH (aq.) | F-14 days |
| 1c | No | No | RT | Conc. $NH_4OH$ (aq.) | F-14 days |
| 1c | No | No | RT | 50% NaOH (aq.) | P-77 days |
| 1c | No | No | 60 | Deionized $H_2O$ | F-3 days |
| 1c | No | No | 60 | 3% $CH_3CO_2H$ (aq.) | F-3 days |
| 1c | No | No | 60 | 3% NaCl (aq.) | F-3 days |
| 1c | No | No | 60 | Toluene | P-75 days |
| 1c | No | No | 60 | Mineral Oil | P-75 days |
| 1c | No | No | 60 | 3% HCl (aq.) | F-3 days |
| 1c | No | No | 60 | 3% $NH_4OH$ (aq.) | F-3 days |
| 1c | No | No | 60 | 3% NaOH (aq.) | F-3 days |
| 6a | No | No | 60 | Deionized $H_2O$ | F-3 days |
| 6a | No | No | 60 | 3% $CH_3CO_2H$ (aq.) | F-3 days |
| 6a | No | No | 60 | 3% NaCl (aq.) | F-3 days |
| 6a | No | No | 60 | Toluene | P-75 days |
| 6a | No | No | 60 | Mineral Oil | P-75 days |
| 6a | No | No | 60 | 3% HCl (aq.) | F-3 days |
| 6a | No | No | 60 | 3% $NH_4OH$ (aq.) | F-3 days |
| 6a | No | No | 60 | 3% NaOH (aq.) | F-3 days |
| 6a | No | No | RT | 100% $CH_3CO_2H$ | P-75 days |
| 6a | No | No | 40 | 100% RH | F-2 days |
| 1c | No | No | 40 | 100% RH | F-2 days |
| 1c | 1% AS | No | 60 | Deionized $H_2O$ | P-71 days |
| 1c | 1% AS | No | 60 | 3% $CH_3CO_2H$ (aq.) | F-16 hr. |
| 1c | 1% AS | No | RT | Methyl ethyl ketone | P-71 days |
| 1c | 1% AS | No | RT | Toluene | P-71 days |
| 1c | 1% AS | No | RT | Isopropanol | P-71 days |
| 1c | 1% AS | No | RT | 3% HCL (aq.) | F-35 days |
| 1c | 1% AS | No | RT | 3% $NH_4OH$ (aq.) | F-35 days |
| 1c | 1% AS | No | RT | Reagent Alcohol | P-71 days |
| 1c | 1% AS | No | RT | Deionized $H_2O$ | P-71 days |
| 1c | 1% AS | No | RT | 100% $CH_3CO_2H$ | F-6 days |
| 1c | 1% AS | No | 40 | 100% RH | F-35 days |
| 1c | 1% AS | No | RT | 3% $CH_3CO_2H$ (aq.) | F-6 days |
| 6a | 1% AS | No | 60 | Deionized $H_2O$ | F-19 days |
| 6a | 1% AS | No | 60 | 3% $CH_3CO_2H$ (aq.) | F-16 hr. |

TABLE 5-continued

Solvent/Environmental Resistance of Epoxy Ink Formulations
0.001 Inch Thick Cured Film on Glass Slides

| Example | Silane on Glass | Silane in Epoxy | Temp. (°C.) | Solvent or Environment | Pass/Fail |
|---|---|---|---|---|---|
| 6a | 1% AS | No | RT | Methyl ethyl ketone | P-71 days |
| 6a | 1% AS | No | RT | Toluene | P-71 days |
| 6a | 1% AS | No | RT | Isopropanol | P-71 days |
| 6a | 1% AS | No | RT | 3% HCl (aq.) | F-35 days |
| 6a | 1% AS | No | RT | 3% NH$_4$OH (aq.) | F-35 days |
| 6a | 1% AS | No | RT | Reagent Alcohol | P-71 days |
| 6a | 1% AS | No | RT | Deionized H$_2$O | P-71 days |
| 6a | 1% AS | No | RT | 100% CH$_3$CO$_2$H | F-6 days |
| 6a | 1% AS | No | 40 | 100% RH | F-19 days |
| 6a | 1% AS | No | RT | 3% CH$_3$CO$_2$H (aq.) | F-19 days |
| 1c | No | 3% ES | 60 | Deionized H$_2$O | P-71 days |
| 1c | No | 3% ES | 60 | 3% CH$_3$CO$_2$H (aq.) | F-6 days |
| 1c | No | 3% ES | RT | Methyl ethyl ketone | P-71 days |
| 1c | No | 3% ES | RT | Toluene | P-71 days |
| 1c | No | 3% ES | RT | Isopropanol | P-71 days |
| 1c | No | 3% ES | RT | 3% HCl (aq.) | P-71 days |
| 1c | No | 3% ES | RT | 3% NH$_4$OH (aq.) | P-71 days |
| 1c | No | 3% ES | RT | Reagent Alcohol | P-71 days |
| 1c | No | 3% ES | RT | Deionized H$_2$O | P-71 days |
| 1c | No | 3% ES | RT | 100% CH$_3$CO$_2$H | P-71 days |
| 1c | No | 3% ES | 40 | 100% RH | P-71 days |
| 1c | No | 3% ES | RT | 3% CH$_3$CO$_2$H (aq.) | P-71 days |
| 6a | No | 3% ES | 60 | Deionized H$_2$O | P-71 days |
| 6a | No | 3% ES | 60 | 3% CH$_3$CO$_2$H (aq.) | F-6 days |
| 6a | No | 3% ES | RT | Methyl ethyl ketone | P-71 days |
| 6a | No | 3% ES | RT | Toluene | P-71 days |
| 6a | No | 3% ES | RT | Isopropanol | P-71 days |
| 6a | No | 3% ES | RT | 3% HCl (aq.) | P-71 days |
| 6a | No | 3% ES | RT | 3% NH$_4$OH (aq.) | P-71 days |
| 6a | No | 3% ES | RT | Reagent Alcohol | P-71 days |
| 6a | No | 3% ES | RT | Deionized H$_2$O | P-71 days |
| 6a | No | 3% ES | RT | 100% CH$_3$CO$_2$H | P-71 days |
| 6a | No | 3% ES | 40 | 100% RH | P-71 days |
| 6a | No | 3% ES | RT | 3% CH$_3$CO$_2$H (aq.) | P-71 days |
| 6a | No | No | 60 | Deionized H$_2$O | F-6 days |
| 1c | No | No | 60 | Deionized H$_2$O | F-6 days |
| 6a | No | 6% ES | RT | 3% CH$_3$CO$_2$H (aq.) | P-65 days |
| 6a | No | 6% ES | 40 | 3% CH$_3$CO$_2$H (aq.) | P-65 days |
| 6a | No | 6% ES | 60 | 3% CH$_3$CO$_2$H (aq.) | F-14 days |
| 6a | No | 6% ES | 40 | 100% RH | P-65 days |
| 6a | No | 6% ES | 60 | Deionized H$_2$O | P-65 days |
| 6b | No | No | RT | 3% CH$_3$CO$_2$H (aq.) | P-65 days |
| 6b | No | No | 40 | 3% CH$_3$CO$_2$H (aq.) | P-65 days |
| 6b | No | No | 60 | 3% CH$_3$CO$_2$H (aq.) | F-16 hr. |
| 6b | No | No | 40 | 100% RH | P-65 days |
| 6b | No | No | 60 | Deionized H$_2$O | P-65 days |
| 2a | No | No | RT | 3% CH$_3$CO$_2$H (aq.) | P-65 days |
| 2a | No | No | 40 | 3% CH$_3$CO$_2$H (aq.) | P-65 days |
| 2a | No | No | 60 | 3% CH$_3$CO$_2$H (aq.) | F-16 hr. |
| 2a | No | No | 40 | 100% RH | P-65 days |
| 2a | No | No | 60 | Deionized H$_2$O | P-65 days |
| 6a | 0.5% AS 110 C. | No | 60 | Deionized H$_2$O | F-60 days |
| 6b | 0.5% AS 110 C. | 1.3% ES | 60 | Deionized H$_2$O | F-60 days |
| 2a | 0.5% AS 110 C. | 1.3% ES | 60 | Deionized H$_2$O | F-60 days |
| 2a | 0.5% AS 110 C. | 6% ES | 60 | Deionized H$_2$O | F-60 days |
| 6a | 1.0% AS 110 C. | No | 60 | Deionized H$_2$O | P-60 days |
| 6b | 1.0% AS 110 C. | 1.3% ES | 60 | Deionized H$_2$O | P-60 days |
| 2a | 1.0% AS 110 C. | 1.3% ES | 60 | Deionized H$_2$O | P-60 days |
| 2a | 1.0% AS 110 C. | 6% ES | 60 | Deionized H$_2$O | P-60 days |
| 6a | 2.0% AS 110 C. | No | 60 | Deionized H$_2$O | P-60 days |
| 6b | 2.0% AS 110 C. | 1.3% ES | 60 | Deionized H$_2$O | P-60 days |
| 2a | 2.0% AS 110 C. | 1.3% ES | 60 | Deionized H$_2$O | P-60 days |
| 2a | 2.0% AS 110 C. | 6% ES | 60 | Deionized H$_2$O | P-60 days |
| 6a | 0.5% AS RT 24 hr | No | 60 | Deionized H$_2$O | P-60 days |
| 6b | 0.5% AS RT 24 hr | 1.3% ES | 60 | Deionized H$_2$O | P-60 days |
| 2a | 0.5% AS RT 24 hr | 1.3% ES | 60 | Deionized H$_2$O | P-60 days |
| 2a | 0.5% AS RT 24 hr | 6% ES | 60 | Deionized H$_2$O | P-60 days |
| 6a | 1.0% AS RT 24 hr | No | 60 | Deionized H$_2$O | P-60 days |
| 6b | 1.0% AS RT 24 hr | 1.3% ES | 60 | Deionized H$_2$O | P-60 days |
| 2a | 1.0% AS RT 24 hr | 1.3% ES | 60 | Deionized H$_2$O | P-60 days |
| 2a | 1.0% AS RT 24 hr | 6% ES | 60 | Deionized H$_2$O | P-60 days |
| 6a | 2.0% AS RT 24 hr | No | 60 | Deionized H$_2$O | P-60 days |
| 6b | 2.0% AS RT 24 hr | 1.3% ES | 60 | Deionized H$_2$O | P-60 days |
| 2a | 2.0% AS RT 24 hr | 1.3% ES | 60 | Deionized H$_2$O | P-60 days |
| 2a | 2.0% AS RT 24 hr | 6% ES | 60 | Deionized H$_2$O | P-60 days |
| 6a | 0.5% AS 110 C. | No | 60 | 3% CH$_3$CO$_2$H (aq.) | F-16 hr. |
| 6b | 0.5% AS 110 C. | 1.3% ES | 60 | 3% CH$_3$CO$_2$H (aq.) | F-16 hr. |
| 2a | 0.5% AS 110 C. | 1.3% ES | 60 | 3% CH$_3$CO$_2$H (aq.) | F-16 hr. |
| 2a | 0.5% AS 110 C. | 6% ES | 60 | 3% CH$_3$CO$_2$H (aq.) | F-3 days |
| 6a | 1.0% AS 110 C. | No | 60 | 3% CH$_3$CO$_2$H (aq.) | F-16 hr. |
| 6b | 1.0% AS 110 C. | 1.3% ES | 60 | 3% CH$_3$CO$_2$H (aq.) | F-16 hr. |
| 2a | 1.0% AS 110 C. | 1.3% ES | 60 | 3% CH$_3$CO$_2$H (aq.) | F-16 hr. |
| 2a | 1.0% AS 110 C. | 6% ES | 60 | 3% CH$_3$CO$_2$H (aq.) | F-3 days |
| 6a | 2.0% AS 110 C. | No | 60 | 3% CH$_3$CO$_2$H (aq.) | F-16 hr. |
| 6b | 2.0% AS 110 C. | 1.3% ES | 60 | 3% CH$_3$CO$_2$H (aq.) | F-16 hr. |
| 2a | 2.0% AS 110 C. | 1.3% ES | 60 | 3% CH$_3$CO$_2$H (aq.) | F-16 hr. |
| 2a | 2.0% AS 110 C. | 6% ES | 60 | 3% CH$_3$CO$_2$H (aq.) | F-3 days |
| 6a | 0.5% AS RT 24 hr | No | 60 | 3% CH$_3$CO$_2$H (aq.) | F-3 days |
| 6b | 0.5% AS RT 24 hr | 1.3% ES | 60 | 3% CH$_3$CO$_2$H (aq.) | F-3 days |
| 2a | 0.5% AS RT 24 hr | 1.3% ES | 60 | 3% CH$_3$CO$_2$H (aq.) | F-3 days |
| 2a | 0.5% AS RT 24 hr | 6% ES | 60 | 3% CH$_3$CO$_2$H (aq.) | F-6–12 days |

TABLE 5-continued

Solvent/Environmental Resistance of Epoxy Ink Formulations
0.001 Inch Thick Cured Film on Glass Slides

| Example | Silane on Glass | Silane in Epoxy | Temp. (°C.) | Solvent or Environment | Pass/Fail |
|---|---|---|---|---|---|
| 6a | 1.0% AS RT 24 hr | No | 60 | 3% $CH_3CO_2H$ (aq.) | F-16 hr. |
| 6b | 1.0% AS RT 24 hr | 1.3% ES | 60 | 3% $CH_3CO_2H$ (aq.) | F-16 hr. |
| 2a | 1.0% AS RT 24 hr | 1.3% ES | 60 | 3% $CH_3CO_2H$ (aq.) | F-3 days |
| 2a | 1.0% AS RT 24 hr | 6% ES | 60 | 3% $CH_3CO_2H$ (aq.) | F-3 days |
| 6a | 2.0% AS RT 24 hr | No | 60 | 3% $CH_3CO_2H$ (aq.) | F-16 hr. |
| 6b | 2.0% AS RT 24 hr | 1.3% ES | 60 | 3% $CH_3CO_2H$ (aq.) | F-16 hr. |
| 2a | 2.0% AS RT 24 hr | 1.3% ES | 60 | 3% $CH_3CO_2H$ (aq.) | F-3 days |
| 2a | 2.0% AS RT 24 hr | 6% ES | 60 | 3% $CH_3CO_2H$ (aq.) | F-3 days |
| 6a | 0.5% AS 110 C. | No | 40 | 100% RH | P-60 days |
| 6b | 0.5% AS 110 C. | 1.3% ES | 40 | 100% RH | P-60 days |
| 2a | 0.5% AS 110 C. | 1.3% ES | 40 | 100% RH | P-60 days |
| 2a | 0.5% AS 110 C. | 6% ES | 40 | 100% RH | P-60 days |
| 6a | 1.0% AS 110 C. | No | 40 | 100% RH | P-60 days |
| 6b | 1.0% AS 110 C. | 1.3% ES | 40 | 100% RH | P-60 days |
| 2a | 1.0% AS 110 C. | 1.3% ES | 40 | 100% RH | P-60 days |
| 2a | 1.0% AS 110 C. | 6% ES | 40 | 100% RH | P-60 days |
| 6a | 2.0% AS 110 C. | No | 40 | 100% RH | P-60 days |
| 6b | 2.0% AS 110 C. | 1.3% ES | 40 | 100% RH | P-60 days |
| 2a | 2.0% AS 110 C. | 1.3% ES | 40 | 100% RH | P-60 days |
| 2a | 2.0% AS 110 C. | 6% ES | 40 | 100% RH | P-60 days |
| 6a | 0.5% AS RT 24 hr | No | 40 | 100% RH | P-60 days |
| 6b | 0.5% AS RT 24 hr | 1.3% ES | 40 | 100% RH | P-60 days |
| 2a | 0.5% AS RT 24 hr | 1.3% ES | 40 | 100% RH | P-60 days |
| 2a | 0.5% AS RT 24 hr | 6% ES | 40 | 100% RH | P-60 days |
| 6a | 1.0% AS RT 24 hr | No | 40 | 100% RH | P-60 days |
| 6b | 1.0% AS RT 24 hr | 1.3% ES | 40 | 100% RH | P-60 days |
| 2a | 1.0% AS RT 24 hr | 1.3% ES | 40 | 100% RH | P-60 days |
| 2a | 1.0% AS RT 24 hr | 6% ES | 40 | 100% RH | P-60 days |
| 6a | 2.0% AS RT 24 hr | No | 40 | 100% RH | P-60 days |
| 6b | 2.0% AS RT 24 hr | 1.3% ES | 40 | 100% RH | P-60 days |
| 2a | 2.0% AS RT 24 hr | 1.3% ES | 40 | 100% RH | P-60 days |
| 2a | 2.0% AS RT 24 hr | 6% ES | 40 | 100% RH | P-60 days |
| 6a | 0.5% AS RT + 110 | No | 60 | 3% $CH_3CO_2H$ (aq.) | F-2 days |
| 2a | 0.5% AS RT + 110 | 1.3% ES | 60 | 3% $CH_3CO_2H$ (aq.) | F-2 days |
| 2a | 0.5% AS RT + 110 | 3% ES | 60 | 3% $CH_3CO_2H$ (aq.) | F-2 days |

EXAMPLE VII

The height of the printed and cured glass frit and several epoxy ink reflectors were measured. For these measurements, the height of 20 reflectors in a ⅙ test pattern were selected. A ⅙ pattern is one in which the reflector width is about one half-acoustic wavelength and the inter reflector gap is about 5½ acoustic wavelengths. The results are presented in Table 6.

TABLE 6

| Ink | Average height (microns) | Standard Deviation |
|---|---|---|
| Glass frit #1 | 4.3 | 0.22 |
| Glass frit #2 | 6.4 | 0.65 |
| Example 1e #1 | 20.8 | 5.39 |
| Example 1e #2 | 17.5 | 3.55 |
| Example 1c | 14.2 | 1.36 |
| Example 1d #1 | 12.4 | 2.09 |
| Example 1d #2 | 13.5 | 1.82 |
| Example 2a #1 | 14.6 | 0.81 |
| Example 2a #2 | 16.3 | 1.23 |
| Example 2b #1 | 13.7 | 1.67 |
| Example 2b #2 | 14.2 | 0.97 |
| Example 2c | 14.5 | 1.85 |
| Example 2d | 10.8 | 2.01 |

Table 6 shows that a glass frit is about 4–7 microns high and epoxy ink reflectors are about 12–17 microns high for the Lithopone™ filled formulations (Examples 1d, 2a, and 2b). If the area under the profiles is integrated and the volume of an individual reflector calculated, the weight of the reflector is determinable from its density. Table 7 shows that the epoxy ink of Example 2b and a glass frit reflector have essentially the same weight.

TABLE 7

| Ink | Volume × $10^{-5}$ $cm^3$ | Density (g/$cm^3$) | Weight of reflector × $10^{-5}$ g |
|---|---|---|---|
| Glass frit | 1.41 | 5.6 | 9.5 |
| Example 2b | 3.90 | 1.91 | 7.5 |
| Example 1d | 2.64 | 2.16 | 5.7 |
| Example 2c | 3.3 | 3.0 | 11.9 |
| Example 1f | 3.19 | 5.47 | 17.4 |

EXAMPLE VIII

In order to determine the effect of the polymer's $T_g$, studies were performed using epoxies having differing degrees of cross linking, and, therefore, $T_g$'s. It is believed that undesirably high absorption is correlated with a low $T_g$ and a low modulus in the epoxy binder, and that desirably low absorption is correlated with a high $T_g$ and a high modulus in the epoxy binder. Therefore, a series of ink formulations, Examples 2b, and 8a–8k, as shown in Table 8, were made, varying the modulus of the epoxy from rigid to rubbery. The more rubbery formulations were 8e, 8f and 8g. On the other hand, three formulations, 8a, 8j and 8k, when cured yield very rigid resins with high $T_g$'s. Two formulations, 8b and 8i, had higher filler loadings. Example 8i is comparable to Example 8e, demonstrating the effect of increasing the filler loading. Example 8h includes a different curing agent, LANDEC XE-7004, which allows curing at a lower temperature.

TABLE 8

| Property | Example 2b | 8a | 8b | 8c | 8d | 8e |
|---|---|---|---|---|---|---|
| Ciba PY-306 (g) | 0 | 0 | 50 | 0 | 0 | 0 |
| Ciba PY-307 (g) | 100 | 0 | 0 | 85 | 70 | 50 |
| DOW DER 732 (g) | 0 | 0 | 0 | 15 | 30 | 50 |
| Ciba-ECN 1138 (g) | 0 | 100 | 0 | 0 | 0 | 0 |
| Shell Epon 825 (g) | 0 | 0 | 50 | 0 | 0 | 0 |
| Ciba MY-722 (g) | 0 | 0 | 0 | 0 | 0 | 0 |
| Shell Epon 828 (g) | 0 | 0 | 0 | 0 | 0 | 0 |
| Diaminodiphenyl sulfone (g) | 0 | 0 | 0 | 0 | 0 | 0 |
| $BF_3$ monoethylamine (g) | 0 | 0 | 0 | 0 | 0 | 0 |
| BTDA anhydride (g) | 0 | 0 | 0 | 0 | 0 | 0 |
| Amicure CG-1200 (g) | 8 | 8 | 8 | 8 | 8 | 8 |
| Curezol 2-PHZ (g) | 2 | 2 | 2 | 2 | 2 | 2 |
| Landec XE-7004 (g) | 0 | 0 | 0 | 0 | 0 | 0 |
| Lithopone 70/30 (g) | 120 | 120 | 388 | 120 | 120 | 120 |
| Tungsten M-55 (g) | 0 | 0 | 0 | 0 | 0 | 0 |
| Ethyl Lactate (g) | 5 | 13 | 30 | 0 | 0 | 0 |
| Epoxy silane (g) | 6 | 3 | 3 | 6 | 6 | 6 |
| FC-430 (g) | 0.2 | 0.2 | 0.2 | 0.2 | 0.2 | 0.2 |
| Cab-O-Sil TS-720 (g) | 0 | 0 | 0 | 3 | 3 | 3 |
| Total (g) | 241.2 | 246.2 | 531.2 | 239.2 | 239.2 | 239.2 |
| Density (gm/cm³) | 1.875 | 1.894 | 2.68 | 1.852 | 1.83 | 1.802 |
| Added silane (%) | | 3 | 3 | | | |
| Added ethyl lactate (%) | | 3 | 3 | | | |
| Touchscreen performance | Good | Good | Good† | Good | Poor | Good |
| Remarks | | | High filler | | Print | |

| Material or Property | Example 8f | 8g | 8h | 8i | 8j | 8k |
|---|---|---|---|---|---|---|
| Ciba PY-306 (g) | 0 | 0 | 0 | 0 | 0 | 0 |
| Ciba PY-307 (g) | 35 | 20 | 100 | 50 | 0 | 0 |
| Dow DER 732 (g) | 65 | 80 | 0 | 50 | 0 | 0 |
| Ciba-ECN 1138 (g) | 0 | 0 | 0 | 0 | 0 | 0 |
| Shell Epon 825 (g) | 0 | 0 | 0 | 0 | 0 | 0 |
| Ciba MY-722 (g) | 0 | 0 | 0 | 0 | 100 | 0 |
| Shell Epon 828 (g) | 0 | 0 | 0 | 0 | 0 | 100 |
| Diaminodiphenyl sulfone (g) | 0 | 0 | 0 | 0 | 50 | 0 |
| $BF_3$ monoethylamine (g) | 0 | 0 | 0 | 0 | 1 | 0 |
| BTDA anhydride (g) | 0 | 0 | 0 | 0 | 0 | 48.3 |
| Amicure CG-1200 (g) | 8 | 8 | 0 | 8 | 0 | 0 |
| Curezol 2-PHZ (g) | 2 | 2 | 0 | 2 | 0 | 0 |
| Landec XE-7004 (g) | 0 | 0 | 18 | 0 | 0 | 0 |
| Lithopone 70/30 (g) | 120 | 120 | 137 | 81 | 167 | 130 |
| Tungsten M-55 (g) | 0 | 0 | 0 | 190 | 0 | 0 |
| Ethyl Lactate (g) | 0 | 0 | 0 | 0 | 10 | 15 |
| Epoxy silane (g) | 6 | 6 | 6.5 | 6 | 6 | 6 |
| FC-430 (g) | 0.2 | 0.2 | 0.2 | 0.2 | 0.2 | 0.2 |
| Cab-O-Sil TS-720 (g) | 3 | 3 | 0 | 2 | 2 | 2 |
| Total (g) | 239.2 | 239.2 | 261.7 | 389.2 | 336.2 | 301.5 |
| Density (gm/cm³) | 1.781 | 1.761 | 1.845 | 2.932 | 1.867 | 1.859 |
| Added silane (%) | | | 4% | | | |
| Added ethyl lactate (%) | | | | | | |
| Touchscreen performance | Good | Good | Poor | Good† | Good | Poor |
| Remarks | | | | High density | | |

†The printed array pattern was not optimized for a highly reflective ink, therefore, insufficient signal reached the portion of the reflective array distant from the transducers. Both the formulation of example 8b and example 8i showed high signal strength and reflectivity.

The formulations of Examples 2b and 8a–k were printed on small size soda lime glass, with a touchscreen pattern optimized for this size, and made into touchscreens. The formulations of Examples 2b, 8a, 8j and 8k were also printed on larger size glass substrates and an appropriate larger printing screen and made into touchscreens. All formulations were cured by a cure cycle of about 30 min at temperatures up to 190° C. Two of the touchscreens formed of the formulation of example 2b printed on the small size glass were post-cured for 1 hour at 200° C., as were all of the Example 8j formulation touchscreens.

All the formulations with flexible, low modulus epoxy resin binders made good touchscreens under ambient conditions, except the formulation of Example 8d, which had poor print quality. While the formulations of Examples 8f and 8g made acceptable touchscreens that functioned within specification while dry, these were excessively sensitive to moisture, and were out of specification after a short time at 50° C. and 60% RH.

Example 8k was a very rigid resin with an expected $T_g$ over 250° C. The print had poor quality, likely the reason for inadequate touchscreen performance.

Examples 8b and 8i, with high filler loading, had high reflectivity, as expected, and had excellent ratios of reflectivity to absorption. The screen pattern employed was not optimized for these formulations and therefore the test screen was partially functional. These formulation would likely produce excellent touchscreens if the reflector array design were optimized to take into account their higher density.

Example 8h, with the LANDEC curing agent, also failed to make a good touchscreen. The reason is unknown, but could be poor print quality or high absorption due to the LANDEC curing agent.

Example 2b (normal cure) and Example 8j made good touchscreens in the larger size, for while Example 8k was poor in the larger size. Example 8a produced one larger touchscreen which was good and two which were poor.

EXAMPLE IX

This example demonstrates the preparation of touchscreens having reflective elements made from bismaleimide, cyanate ester or UV light curable epoxy resin. Inks made from each of the three types of resins (detailed composition information provided in Table 9 following) were coated on 7×9 inch touchscreens (two screens per formulation). Each ink coated well, but ink 9b was noticeably thicker. In all three instances an epoxy silance coupling agent was used to bond polymer (i.e., the reflective element) to the glass.

TABLE 9

| Material or Property | Example 9a (Bismaleimide) | Example 9b (Cyanate ester) | Example 9c (UV curable epoxy) |
|---|---|---|---|
| Matrimid 5292A (g) | 100 | — | — |
| Matrimid 5292B (g) | 85 | — | — |
| Arocy B-30 (g) | — | 100 | — |
| CY-179ᵃ (g) | — | — | 100 |
| Cycure 6974 (g) | — | — | 19 |
| N-methyl Pyrrolidone (g) | 135 | — | — |
| Ethyl lactate (g) | 52 | 20 | 20 |
| Nonyl phenol (g) | — | 2 | — |
| Isopropyl thioxanthone (g) | — | — | 2.2 |
| Lithoponeᵉ (g) | 210 | — | — |
| Tungsten M-20ᵇ (g) | — | 75 | — |
| Min-U-Sil 5ᶜ (g) | — | 100 | 190 |
| FC 430 (g) | 0.2 | 0.2 | 0.2 |

TABLE 9-continued

| Material or Property | Example 9a (Bismaleimide) | Example 9b (Cyanate ester) | Example 9c (UV curable epoxy) |
|---|---|---|---|
| Epoxy silane (g) | 3 | 3 | 6 |
| Total (g) | 585.2 | 300.2 | 337.4 |
| Density, gm/cm$^{3d}$ | 1.91 | 1.926 | 1.81 |

[a] Cycloaliphatic epoxy resin (3,4-epoxycyclohexylmethyl-3,4-epoxycyclohexane carboxylate) from Ciba.
[b] Powder (1.25 micron).
[c] Silicon dioxide (5 micron) from U.S. Silica.
[d] Calculated assuming complete evaporation of solvent.

Touchscreens made from the cyanate ester and UV-curable epoxy resins performed satisfactorily. However, the touchscreen made from the bismaleimide resin failed due to lack of a signal. Inspection of the failed device with a microscope showed that the reflector elements were foamed. It appears that the formulation, which had a high solvent content, including a high boiling one, was not dried sufficiently and therefore foamed during curing. It is believed that, if sufficiently dried, it will make a satisfactory touchscreen.

EXAMPLE X

In an effort to understand the effects of ink formulation on acoustic properties, measurements were made on touchscreens conditioned and tested at 50° C. and 60% RH. The touchscreens were printed with the formulations of Examples 8c, 8e, 8f and 8g, which varied in Dow DER 732/Ciba PY 307 ratio from 15/85 to 80/20 (the standard formulation has 100% PY 307). Formulations with more DER 732 have a lower crosslink density and should absorb more moisture, possibly resulting in humidity-based changes in acoustic performance.

After 3 days in an environmental chamber at 50 C and 60% RH, the Example 8c touchscreen waveform signals looked similar to those obtained for touchscreens using the formulation of Example 2b, i.e., they were essentially unaffected. In contrast, touchscreens made with formulations of Examples 8f and 8g showed significant signal loss. After only 30 min out of the environmental chamber, the Example 8g touchscreen recovered nearly all the original signal, and 30 minutes after putting it back in the chamber there was again significant signal loss. Therefore, while systems employing the formulations of Examples 8f and 8g have deficits as simple touch position sensors, these tests demonstrate the utility of employing acoustically reflective polymeric arrays as humidity sensors, or, under appropriate conditions, as specific sensors for other chemicals or gasses.

The sensors using the ink formulation of Example 8c were similar to sensors using the ink formulation of Example 2b. Both were insensitive to humidity. Sensors using the formulation of Example 8d could not be tested due to poor print quality. Sensors constructed using the formulation 8e had some signal loss at elevated humidity and was intermediate in signal loss between formulation 2b and formulations 8f and 8g.

EXAMPLE XI

In contrast to prior art acoustic chemical sensors, a chemical sensor according to the present invention responds to a chemical's effect on the acoustic properties of the polymer, and is not necessarily related the mass of the chemical adsorbed. Rather, the acoustic effect may be an alteration of the reflective, absorptive and/or transmissive properties of an element placed in the path of an acoustic wave. This effect may be non-linearly related to mass absorption, allowing high sensitivity, especially near a transition point.

In addition, the present invention also provides an embodiment which allows for simplified production of a multichannel chemical sensor by employing the spatial resolution of a touchscreen system to distinguish regions of chemically sensitive polymer, in combination with a chemical sensing system, such as the known mass sensing techniques or the present reflectivity/absorptivity/transmissivity techniques. In this latter case, the polymer may be used for forming an array of reflective elements or deposited as a film on a substrate.

Normally, acoustic chemical sensors rely on adsorption of the gas or chemical species to the surface of the sensor, and exciting an acoustic wave which measures a change in mass of the surface layer. The reflective elements of the present invention have a different type of sensitivity, in that the reflectors are relatively insensitive to small changes in mass. Rather, the effect of the chemical, for example humidity, is to change the acoustic interaction of the wave with the reflector which results in reduced signal reflection to the receiving transducer. It is believed that the effect noted in Example IX is increased acoustic absorption by the reflector; however it may also relate to acoustic wave mode interconversions and resulting wave propagation at non-optimal angles, which are then not received properly. Other effects may also occur.

Therefore, a polymer which has a selective absorption for certain chemical species, resulting in a change in properties, such as $T_g$, may be used as a sensor, according to the present invention. In such a case, the system would generally be temperature compensated. Due to the nature of the system, many different polymers may be deposited, providing a sensor having a range of sensitivities. The different polymers are distinguished by the characteristic time delay from the pulse received by the receiving transducer.

Alternately, the spatial resolution of the present sensor system may be used as a level gage, for example of a dividing line between two immiscible fluids, such as gasoline or oil and water. Polymers are well known which have differential swelling, with associated changes in glass transition temperature, due to exposure to hydrocarbons as compared to water. Therefore, the present system may include sets of reflective elements which are formed of such a polymer, immersed in a tank of the mixed fluids, to determine the location of a transition. The polymer exposed to the fluid causes higher absorption will swell, and this swelling may be sensed acoustically, e.g., by a horizontally polarized shear wave, such as a third order wave. The transition region, and therefore liquid level, is determined based on the characteristic timing of an attenuation pattern in the return signal.

The system may also by used as a more traditional acoustic chemical sensor scheme (mass change based), with a polymer layer deposited on the substrate. This system therefore allows spatial determination of a localized effect on the polymer layer, or the use of different polymers, which are distinguished by the characteristic time delay.

Some UV light curable polymers have a low degree of cross linking and are therefore be expected to be susceptible to chemical effects. Sensors employing these polymer inks may not be stable to a range of environmental effects.

The present invention therefore extends the field of acoustic touchscreens by describing such systems which innovate the compositions used to fabricate the touchsensor system, especially the acoustically reflective elements. It should be understood that the preferred embodiments and examples described herein are for illustrative purposes only and are not to be construed as limiting the scope of the present invention, which is properly delineated only in the appended claims.

What is claimed is:

1. A touch sensor system, comprising:
   (a) a substrate capable of propagating acoustic waves; and
   (b) a reflective array formed on said substrate and having a plurality of reflective elements, each reflective element reflecting a portion of an incident acoustic wave, said reflective array comprising an organic matrix, said organic matrix, after formation, being chemically bonded to said substrate.

2. A touch sensor system according to claim 1, wherein said organic matrix comprises a curable resin.

3. A touch sensor system according to claim 1, wherein said organic matrix comprises a thermally curable resin.

4. A touch sensor system according to claim 1, wherein said organic matrix comprises a thermally curable resin having a thermal cure initiation temperature below about 250° C.

5. A touchsensor system according to claim 1, wherein said organic matrix comprises a UV light curable resin.

6. A touch sensor system according to claim 1, wherein said organic matrix comprises an epoxy resin.

7. A touch sensor system according to claim 1, wherein said organic matrix comprises a polymer including a curable composition selected from the group consisting of epoxy resin, cyanate ester resin, polyester resin, phenolic resin, bismaleimide resin, and combinations thereof.

8. A touch sensor system according to claim 1, wherein said organic matrix comprises a polymer having a glass transition temperature above about 120° C.

9. A touch sensor system according to claim 1, wherein said organic matrix comprises:
   (a) a polymer resin having a functionality of greater than about 1.7, including one or more compositions having functional groups selected the group consisting of epoxy, cyanate ester, polyester, phenolic, and bismaleimide;
   (b) a thermoset curing agent, capable of initiating cure of said resin at a temperature below about 250° C.; and
   (c) a silane composition having a silane functional group and an additional functional group capable, of covalently binding said polymer resin.

10. A touch sensor system according to claim 9, further comprising a surfactant, capable of wetting glass.

11. A touch sensor system according to claim 1, wherein said reflective elements further comprise a dense filler dispersed in said organic matrix.

12. A touch sensor system according to claim 11, wherein said dense filler is selected from the group consisting of powdered tungsten, tungsten trioxide, tungsten carbide, calcium carbonate, lead oxide, zinc oxide, barium sulfate, zinc sulfide, silicon dioxide, and combinations thereof.

13. A touch sensor according to claim 11, wherein said dense filler has a density greater than about 4.0 g/cm$^3$.

14. A touch sensor system according to claim 11, wherein said dense filler comprises a coprecipitate of barium sulfate and zinc sulfide.

15. A touch sensor system according to claim 11, wherein said dense filler comprises a tungsten-containing composition.

16. A touch sensor according to claim 1, wherein said substrate comprises a siliceous composition, wherein said siliceous composition is treated with a silane composition prior to formation of said reflective array thereon.

17. The touch sensor according to claim 1, wherein said substrate comprises a siliceous composition and said organic matrix further comprises a silane composition.

18. A touch sensor according to claim 1, wherein said organic matrix is printed on said substrate.

19. A touch sensor according to claim 1, wherein said substrate comprises tempered glass.

20. A touch sensor according to claim 1, wherein said substrate is the faceplate of a cathode ray tube.

21. A touch sensor according to claim 1, further comprising:
   (i) a transducer for receiving an acoustic wave from said substrate;
   (ii) each element of said reflecting array reflecting a portion of said acoustic wave toward said transducer, such that a substantially corresponding signal is generated by said transducer under changes in moisture between 10% and 60% RH at a temperature of 50° C.

22. A touch sensor system, comprising:
   (a) a substrate, capable of propagating acoustic waves; and
   (b) a reflective array formed on said substrate, said reflective array having a plurality of reflective elements, each reflective element reflecting a portion of an incident surface acoustic wave, said reflective array comprising an organic matrix, said organic matrix being a thermoset polymer curing at a temperature above about 50° C. and below about 250° C.

* * * * *